(12) United States Patent
Forney, III et al.

(10) Patent No.: US 7,231,948 B2
(45) Date of Patent: Jun. 19, 2007

(54) NON-PNEUMATIC TIRE

(75) Inventors: Jacob Charles Forney, III, Carlisle, PA (US); Zhang Qing Hua, Shenzhen (CN)

(73) Assignee: Carlisle Intangible Company, Syracuse, NY (US)

( * ) Notice: Subject to any disclaimer, the term of this patent is extended or adjusted under 35 U.S.C. 154(b) by 318 days.

(21) Appl. No.: 10/803,753

(22) Filed: Mar. 18, 2004

(65) Prior Publication Data

US 2005/0205181 A1    Sep. 22, 2005

(51) Int. Cl.
*B60C 7/00*    (2006.01)
(52) U.S. Cl. ...................................... 152/310; 152/323
(58) Field of Classification Search ........ 152/310–314, 152/318, 323, 514, 453, DIG. 18; 156/112; 264/46.6, 46.9
See application file for complete search history.

(56) References Cited

U.S. PATENT DOCUMENTS

| | | | | |
|---|---|---|---|---|
| 636,896 | A | * | 11/1899 | Clark .......................... 152/192 |
| 662,160 | A | * | 11/1900 | Alexander et al. ........... 152/192 |
| 668,292 | A | * | 2/1901 | Johnston ...................... 152/313 |
| 758,209 | A | * | 4/1904 | Hendey ........................ 152/192 |
| 917,545 | A | * | 4/1909 | Collier ......................... 156/78 |
| 1,503,432 | A | * | 7/1924 | Schragin ...................... 156/119 |
| 2,709,471 | A | * | 5/1955 | Smith et al. ................. 152/310 |
| 3,646,983 | A | * | 3/1972 | Van Lieshoud ............. 152/323 |
| 4,094,353 | A | | 6/1978 | Ford |
| 4,909,972 | A | | 3/1990 | Britz |
| 5,073,444 | A | | 12/1991 | Shanelec |
| 5,080,737 | A | | 1/1992 | Shoner |
| 5,229,047 | A | | 7/1993 | Becker |
| 5,605,657 | A | | 2/1997 | Nybakken et al. |
| 5,681,411 | A | | 10/1997 | O'Coin |
| 6,165,397 | A | | 12/2000 | Panaroni et al. |
| 6,187,125 | B1 | | 2/2001 | Rustad et al. |
| 6,450,222 | B1 | | 9/2002 | Fleming |
| 6,629,550 | B2 | | 10/2003 | Rustad |
| 2002/0129883 | A1 | | 9/2002 | O'Coin |
| 2002/0166223 | A1 | | 11/2002 | McMahon et al. |

FOREIGN PATENT DOCUMENTS

GB    2047637 A  *  12/1980    ................. 152/313

* cited by examiner

*Primary Examiner*—Geoffrey L. Knable
(74) *Attorney, Agent, or Firm*—Wood, Herron & Evans, L.L.P.

(57) ABSTRACT

A non-pneumatic tire comprising a toroidal-shaped tube having inner and outer circumferential surfaces and opposite side surfaces collectively forming a hollow chamber therebetween, the tube having at least two openings proximate the inner circumferential surface, and a solid fill composition disposed in the hollow chamber of the tube. The non-pneumatic tire provides the benefits of a smooth, comfortable ride, durability, and lightweight with good load-carrying capability.

28 Claims, 3 Drawing Sheets

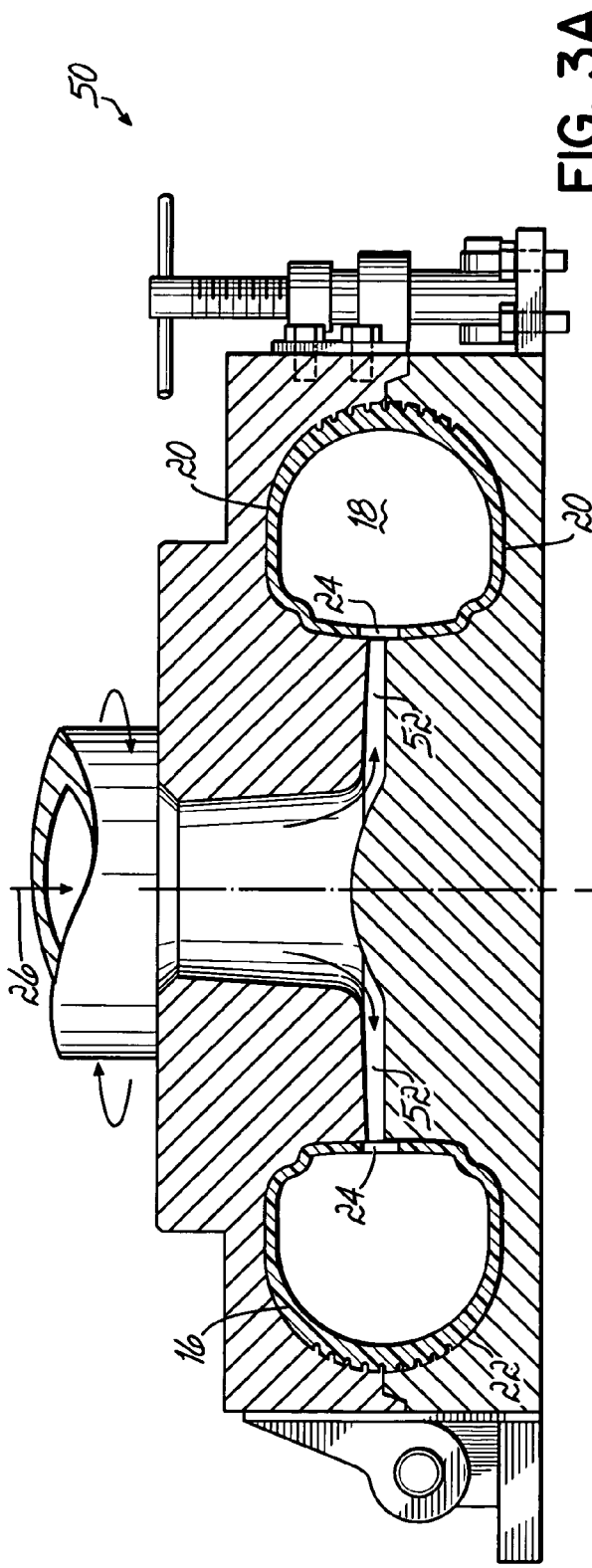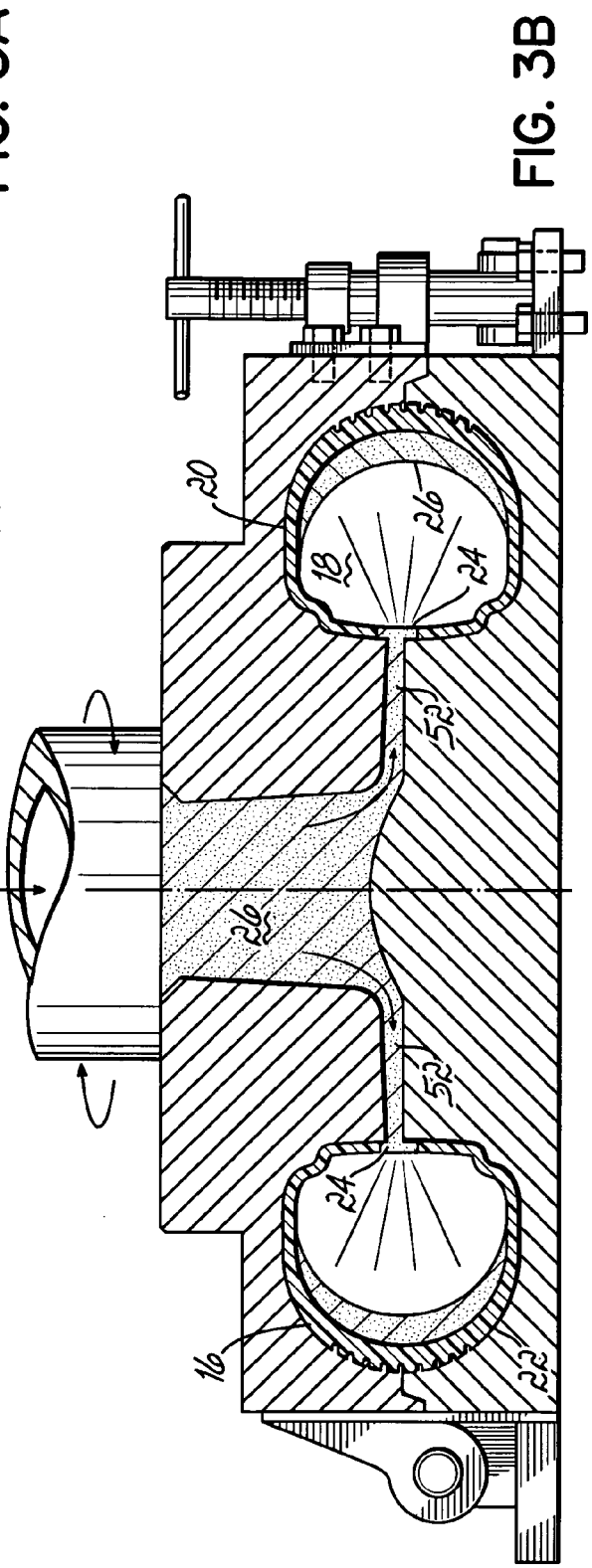

NON-PNEUMATIC TIRE

FIELD OF THE INVENTION

The present invention relates to non-pneumatic tires and, in particular, to foam-filled non-pneumatic tires.

BACKGROUND OF THE INVENTION

Pneumatic tires, which are pressurized air-filled tires, have proven valuable in providing a comfortable ride with optimal load-carrying capabilities for a variety of vehicles. Consequently, pneumatic tires have become the standard in virtually all passenger tire and high speed wheel applications, and more specifically, in almost every aircraft, automobile, truck, van, bicycle and the like, where ride quality and comfort is an important part of the performance of the vehicle. Pneumatic tires have also been successful in low speed applications, such as on tractors, carts, and the like, where load carrying capability is important. However, the tire carcass in pneumatic tires are susceptible to cracks, punctures and/or other damage causing release of the air trapped inside and resulting in the tire going flat. A flat tire may simply cause inconvenience, by requiring a repair and/or loss of use of the vehicle, or may render the tire unusable and cause more of a financial burden, particularly in industrial applications, by requiring costly tire replacement. The consequences of a flat tire might also be far more dire. For example, a tire suddenly going flat, such as a blow out, can be life threatening, particularly to passengers traveling in the vehicle at high speeds.

As an optional substitute to pneumatic tires, non-pneumatic tires have been developed and utilized in a wide variety of applications. Non-pneumatic tires are typically solid tires having no hollow or air-pressurized cavities or chamber(s) therein, as opposed to semi-pneumatic tires, which are partially filled with air. Being of zero pressure, a non-pneumatic tire is generally deflation-proof, due to the lack of air pressure. The first non-pneumatic tires developed were solid tires formed generally from natural rubber. However, rubber tires require thick walls and thick tread regions to provide load carrying capability comparable to pneumatic tires, and such added rubber results in an undesirable increase in the weight of the tire and a compromise in its ride quality.

More technically advanced non-pneumatic tires have been proposed utilizing various materials having greater performance characteristics than the previously developed rubbers. Particularly, solid non-pneumatic tires formed from polymeric materials, such as polyurethane, have been developed. However, while solid polyurethane tires are capable of carrying higher loads with a smoother ride, they are generally heavier and prone to faster wear and breakdown than pneumatic tires. In addition, solid polyurethane tires are subject to "chunking" (sections separating from the tire body) and are easily cut when used in aggressive applications and/or on rugged terrain. Further, solid polyurethane tires also have reduced traction characteristics as well as UV and ozone resistance when compared to pneumatic tires.

More recently, conventional pneumatic tire shells or casings have been filled with a solid composition, such as a polyurethane elastomer, to produce deflation-proof, non-pneumatic tires in an attempt to overcome the weaknesses of previously developed non-pneumatic tires. For example, U.S. Pat. Nos. 4,943,233, 4,855,096, and 5,906,836 all disclose the use of polyurethane foams as filling materials for a conventional pneumatic tire to produce a non-pneumatic tire, such as a bicycle tire.

In conjunction with producing such non-pneumatic tires, new methods and fill compositions have been proposed. For example, U.S. Pat. No. 6,187,125, issued to Rustad, discloses a fill composition and method for producing a non-pneumatic tire filled with the cured composition. The fill composition is a mixture of a polyisocyanate having an average functionality of at least 2.3; a high molecular weight polyol having a hydroxyol number in the range of about 20 to about 31 and having an actual functionality of greater than 2.1; 6 to 65 weight percent of a polar plasticizing extender oil; and optionally a polyamine in an amount less than 0.5 weight percent. The mixture is cured in the presence of a catalyst to form a resilient polyurethane elastomer having a vertical rebound of greater than about 60% based on ASTM D2632 and Durometer hardness in the range of about 5 to 60 (as measured by the Shore A method).

U.S. Pat. No. 6,450,222, issued to Fleming, discloses a non-pneumatic tire having an elastomeric portion encompassing the tread and a radially inward foam portion. The non-pneumatic tire may be formed from a multi-shot process in a spin cast procedure.

U.S. Pat. No. 5,080,737, issued to Shoner, discloses a method of filling a tire with a composite foam to eliminate rapid deflation "blow-outs". The composite foam tire filling is comprised of a multiplicity of preconstructed, hollow, pressurized elastomeric, one-piece, seamless cells bonded together into a configuration whereby substantially all of the exterior cell wall surface of all cells in the filling is engaged with portions of the exterior cell wall surfaces of the surrounding cells.

U.S. Pat. No. 5,229,047, issued to Becker, discloses a method and apparatus for producing foam elastomer tires for various uses including bicycles and wheel chairs. The method involves spin casting the tires in a mold and filling the mold with a preblended liquid foamable material that is poured directly into the mold or onto a surface immediately adjacent to the mold, prior to entry into the mold.

U.S. Pat. No. 4,094,353, issued to Ford, discloses a process for puncture-proofing a pneumatic tire mounted on a wheel rim comprising filling the tire with a cross-linked mixture of polyoxypropylene polyether polyol and diphenylmethane diisocyanate to form a resilient solid polyurethane fill material inside the tire.

U.S. Pat. No. 4,909,972, issued to Britz, discloses a method of making a solid core locatable between a wheel rim and a tire fitted to the rim, the core formed by introducing a foamable composition into a mold cavity having a substantially inflexible mold surface, and allowing the composition to foam and fill the cavity, prior to removal for placement in a standard tire carcass.

U.S. Publication No. 2002/0129883, issued to O'Coin, discloses a tire including a tread region, a rim region, and a further region between the tread and the rim region containing a foamed rubber.

U.S. Pat. No. 5,605,657, issued to Nybakken, discloses an industrial solid tire for heavy-load, off-road use having a heat-cured, silicone containing polyurethane therein, produced by a batch method.

U.S. Pat. No. 5,073,444, issued to Shanelec, discloses a molded polypropylene foam tire core suitable for all types of wheels. The core may be inserted, in one or more sections, into a pneumatic-type tire casing and mounted on a wheel rim to provide puncture-proof and rupture-proof internal support for said tire casing.

U.S. Pat. No. 5,681,411, issued to O'Coin, discloses a pneumatic tire having a plurality of layers of high density foam rubber formed therein and methods of manufacturing and installing the layers in the tire.

Despite generally having a harder ride and, in some cases, adding more weight to the vehicle in comparison to a pneumatic tire, the availability of deflation proof non-pneumatic tires is generally more economical and practical, relative to pneumatic tires, for many uses and applications in various industries including mining, scrap yards, military, and heavy construction. Non-pneumatic tires eliminate the problem of a flat and/or blowout by eliminating the need for pressurized air. Thus, non-pneumatic tires overcome the inherent problems with pneumatic tires, as discussed above.

However, many of the desirable performance characteristics found in pneumatic tires have not been duplicated in the previously proposed non-pneumatic tires. In particular, the performance characteristics of cushioning ability, roll ability, noise and vibration reductions have not been equaled. Thus, there is a desire to replicate the pneumatic tire characteristics and properties in a non-pneumatic tire. In addition, many of the compositions and methods previously proposed for producing non-pneumatic tires involve polymers which provide an advantage in one property while suffering from a weakness in another property. For example, one polymer may exhibit superior vibration and noise characteristics while possessing an inferior load carrying capacity. Further, the overall costs of previously proposed non-pneumatic tires by methods of producing same has generally increased with the added step of filling, containing and curing the fill material within a pneumatic tire shell. Also, many of the methods previously proposed are unreliable in that they fail to ensure a complete fill without voids, are relatively expensive, and/or raise various safety and/or environmental concerns.

Thus, there exists a need to provide non-pneumatic tires having performance characteristics similar to those of pneumatic tires without the disadvantage of flats and blow-outs. There is also a need to provide a high quality, zero pressure, air-free non-pneumatic tire with improved load handling capacity and without a significant compromise in ride quality. There is a further need to provide non-pneumatic tires having beneficial qualities in a more simplistic, convenient and cost effective manner than previously proposed methods.

SUMMARY OF THE INVENTION

The present invention provides non-pneumatic tires, and methods of making the same, which are configured to be mounted on rims and used as wheels for a variety of vehicular applications. The tires address the weaknesses and drawbacks of previously proposed and utilized non-pneumatic tires by providing the benefits of smooth ride, good durability and excellent traction characteristics, similar to that of a comparable pneumatic tire, while remaining light weight, ozone and UV resistant, characteristics not otherwise found with traditional non-pneumatic tires, and providing these properties without a compromise in load carrying capacity and/or ride comfort. The tires accomplish these advantages while eliminating the hazards and costs associated with deflation and/or flats, which can occur with pneumatic tires.

In one embodiment, the present invention provides non-pneumatic tires comprising (1) a toroidal-shaped tube having an inner circumferential surface, an outer circumferential surface and a hollow chamber therebetween, with the tube having at least two openings independently located proximate the inner circumferential surface, and (2) a solid fill composition disposed in the hollow chamber of the tube.

The enclosed, annular tube forms the outer toroidal-shaped tire casing and is generally formed of conventional elastomeric material, such as rubber. The tube, however, may be formed from one or more layers of desired elastomers. Rubber, and other similar elastomeric materials, generally provide good traction, are generally amenable to desirable tread patterns, and are typically cheap and lightweight. Further, it provides a protective layer over the fill composition conferring UV and ozone resistant properties to the tire.

The inner circumferential section of the tube includes two or more circumferentially spaced openings or slots cut therein. The location, relative the inner circumference, and dimension of each opening may vary as desired. In one embodiment, the openings are rectangular with the length extending in the direction parallel to the tire's circumference. In another embodiment, the tube includes between 4 and 12 openings evenly spaced along its inner diameter. A larger number of openings, particularly openings having large dimensions, generally compromise the integrity and/or durability of the tire.

Enclosed within the hollow interior cavity of the tube is a solid foam fill composition. This composition forms the core of the tire. In one embodiment, the composition is a foam material, such as a polyurethane. The composition may further include desirable additives, such as a blending agent. Where the desired composition is a liquid, it can be injected, for example, into the tube, advantageously through the cut openings and cured or hardened therein to form the core.

The core composition generally influences the overall physical properties of the tire. For example, the composition can be modified as desired to adjust the hardness, softness of the tire, thereby affecting the ride quality, comfort, and/or load capacity. In one embodiment, the composition has a Durometer hardness of greater than about 60 as measured by Shore A. In another, a Durometer hardness in the range of about 68-75.

In another embodiment of the invention, there is provided a non-pneumatic tire comprising (1) a toroidal-shaped tube having an inner circumferential surface, an outer circumferential surface and a hollow chamber therebetween, with the tube having a number of independent openings ranging from 4 to 12 with each opening at spaced locations proximate the inner circumferential surface; and (2) a solid fill composition disposed in the hollow chamber of the tube, the composition having a surface Durometer hardness of greater than about 60, as measured by Shore A.

In yet another embodiment, there is provided a non-pneumatic tire compromising (1) a toroidal-shaped rubber tube having an inner circumferential surface, an outer circumferential surface, and a hollow chamber therebetween, with the tube comprising 8 rectangular openings, each opening having a width ranging from about 0.3 inches to about 0.5 inches and a length ranging from about 0.6 inches to about 0.8 inches, the 8 openings being equidistantly spaced along the interior circumferential surface; an outer diameter ranging from about 8 inches to about 20 inches, an inner diameter ranging from about 2 inches to about 16 inches; an outer circumferential surface having a width ranging from about 2 inches to about 6 inches; and a height between the outer and inner circumferential surfaces ranging from about 2 inches to about 6 inches; and (2) a solid polyurethane foam fill composition disposed in the hollow chamber of the tube, with the composition having a surface Durometer hardness in the range from about 68 to about 75, as measured by Shore A.

The non-pneumatic tires provided herein may be made by various different methods. In one embodiment of the invention, there is provided a method of making a non-pneumatic tire comprising extruding a toroidal-shaped tube having an inner circumferential surface, an outer circumferential surface, and a hollow chamber therebetween; cutting at least two openings in the extruded tube at spaced locations proximate the inner circumferential surface; and filling the hollow chamber of the tube with a fill composition through the at least two cut openings to make a non-pneumatic tire.

Such methods may generally be carried out utilizing various molds. For example, the elastomeric material, or rubber, may be extruded from a die and formed into a tube of desired dimension. As such, the rubber is then cured, in or outside of a mold, and the desired number of slots or openings are cut along the inner circumferential section or diameter of the extruded tube. Conventional methods and instruments may be utilized to cut sections of the tube once formed.

The hollow cavity within the tube is generally filled by conventional methods known in the art. For example, in one embodiment the tube is filled by injecting the fill composition through the openings previously cut. Desirable foam compositions, such as a liquid polyurethane compositions, may be injected into the tube using a spin casting method, also referred to as a spin rotational method, through the slots of the rotating tube. The centrifugal force, due to rotation generally disperses the composition evenly throughout the interior cavity of the tube until the entire chamber is filled. The composition is then allowed to cure, generally at ambient conditions, and the foam begins to set or harden after as little as ten minutes. The filled tire may then be removed from the mold and allowed to sit for additional time such as 24 hours to allow the composition to fully cure. The non-pneumatic tire may then be mounted on a rim to form a wheel useful for various vehicle applications including, without limitation, low speed carts, wheel barrows, hand carts, golf carts, material carts, construction carts, lawn mowers, motorized/non-motorized wheel chairs and the like, and agricultural implements and machinery including, without limitation, planters, grain drills, cultivators, and many other applications.

BRIEF DESCRIPTION OF THE DRAWINGS

The accompanying drawings, which are incorporated in and constitute a portion of this specification, illustrate embodiments of the invention and together with the general description of the invention given above and the detailed description of the embodiments given below serve to explain the principles of the invention.

FIGS. 3A-3C are schematic cross-sectional views of an exemplary method of making the non-pneumatic tires of the present invention.

DETAILED DESCRIPTION OF THE DRAWINGS

The present invention provides non-pneumatic tires for use as wheels in a variety of vehicles and related tire applications. The tires generally include an outer tire casing or a tubular shell and an inner solid fill composition inside the casing. Such a combination results in tires having a comfortable ride with good durability and traction, similar to that of a comparable pneumatic tire. In addition, this combination provide tires that are fairly light in weight with greater ozone and UV resistance, relative traditional non-pneumatic tires, and provide these benefits while eliminating the risks and costs associated with flat tires, which can occur with pneumatic tires.

Figure 1:
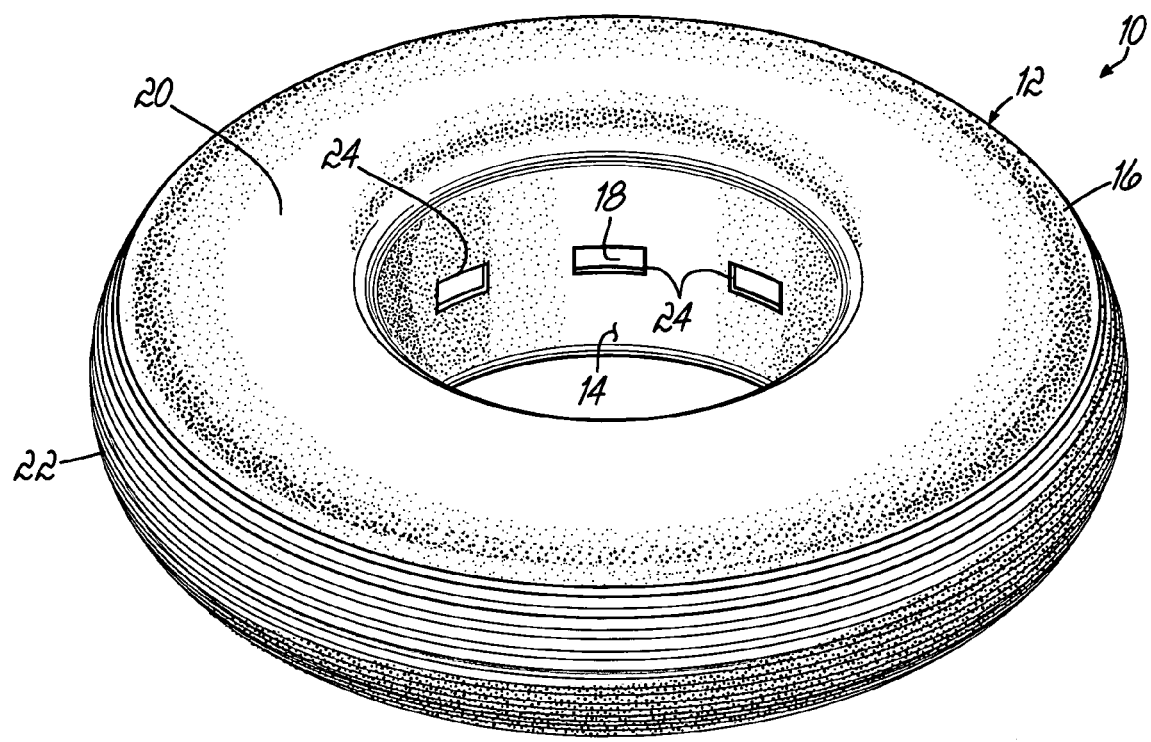
FIG. 1 is perspective view of one embodiment of the present invention.

With reference to FIG. 1, there is shown a non-pneumatic tire 10 including an outer tube 12 and a solid fill composition 26 (FIG. 2) inside tube 12. Tube 12 forms the outer casing or shell for tire 10 and is a hollow toroid shaped shell, such as an inner tube. The elastomeric outer tube provides a soft flexible and durable surface. Tube 12 is formed generally of one or more layers of rubber or other elastomeric material, or combinations thereof. For example, shell 12 may be formed from a variety of acceptable rubber type materials commonly utilized in tires. The term "rubber" as used herein, is used generically and includes a whole host of conventionally known and utilized polymeric and elastomeric compositions. Examples of rubbers that are suitable for the outer tire shell include, without limitation, natural rubbers (NR), and synthetic rubbers such as NBR and SBR. Examples of synthetic rubbers include polyisoprene, polybutadiene, polychloroprene, butyl rubber, styrene-butadiene co-polymers, acrylonitrile-butadiene-styrene co-polymers, EPDM (ethylene-propylene-diene) terpolymers, and the like. These rubbers may be cross-linked, for instance, under the action of sulfur, peroxides, or bis-maleimides, with or without sulfur. The rubber composition may comprise a single rubber compound or a mixture of two or more rubber compounds of the same type or different types. The rubber, or layers thereof, forming tube 12 may further include known additives common to rubber compositions, such as: reinforcing carbon blacks; inactive fillers such as calcium carbonates, chalks, talcs, or metal oxides; accelerator systems; vulcanization retarders; promoters such as zinc oxide or stearic acid; plasticizers such as aromatic, paraffinic, naphthenic and synthetic mineral oils; aging, light-protecting ozone-protecting, fatigue, coloration, and processing auxiliaries; and sulfur. These additives may be used in a quantity of about 0.1 parts to about 80 parts by weight per 100 parts by weight of the rubber composition, as appreciated by those of ordinary skill in the art.

Tube 12 is generally in the form of a toroidal shaped hollow tube, such as an inner tube, and includes an inner circumferential surface 14 and an outer circumferential surface 16 and a hollow chamber 18 or cavity therebetween. As shown, hollow chamber 18 is filled with a solid fill composition 26. As appreciated by those of ordinary skill in the art, tube 12 also includes opposing side walls 20 connecting inner and outer circumferential surfaces 14, 16, respectively. Outer circumferential surface 16 may further include a raised section 22, typically included and generally referred to on tires as a tread pattern or area. The design of such tread may be as any design desired by the maker of the tire. The tread provides traction as well as cushion and ride qualities for the tire, depending upon the tread depth, thickness and particular pattern.

Tube 12 further includes two or more circumferentially spaced openings 24 or slots cut along inner circumferential surface 14, or proximate the interior diameter of tire 10. As illustrated in FIG. 1, tire 10 includes 8 rectangular-shaped openings 24 (only 3 are shown) longitudinally extending in the direction generally parallel to the circumference of tire 10. While so illustrated, however, the invention is not so limited and tube 12 may include as few as 2 separate, independent openings 24 or as many as desired. For example, in one embodiment, tube 12 includes between 4 and 12 openings 24 evenly spaced along inner diameter 14. Further, the specific dimensions of openings 24 may vary, as desired. For example, and in one embodiment, each opening 24 is rectangular in shape having a width ranging from about 0.2 inches to about 0.8 inches and a length ranging from about 0.5 inches to about 1 inch. Each opening 24 illustrated in FIG. 1 is generally about 0.5 inches in width and about 0.75 inches in length. The specific dimension of openings 24 in general, as well as the number of openings 24, affect the properties of the tire. For example, larger dimensioned openings 24, as well as a larger number of openings 24, will generally reduce the integrity and/or the durability of tube 12. It has been found that about 8 openings 24, each having the dimensions described in connection with FIG. 1 has produced good durability relative traditional non-pneumatic tires. Openings 24 may also be sized as needed based upon the method of filling the fill composition 26 in tube 12, as will be described herein with respect to FIG. 2.

Figure 2:
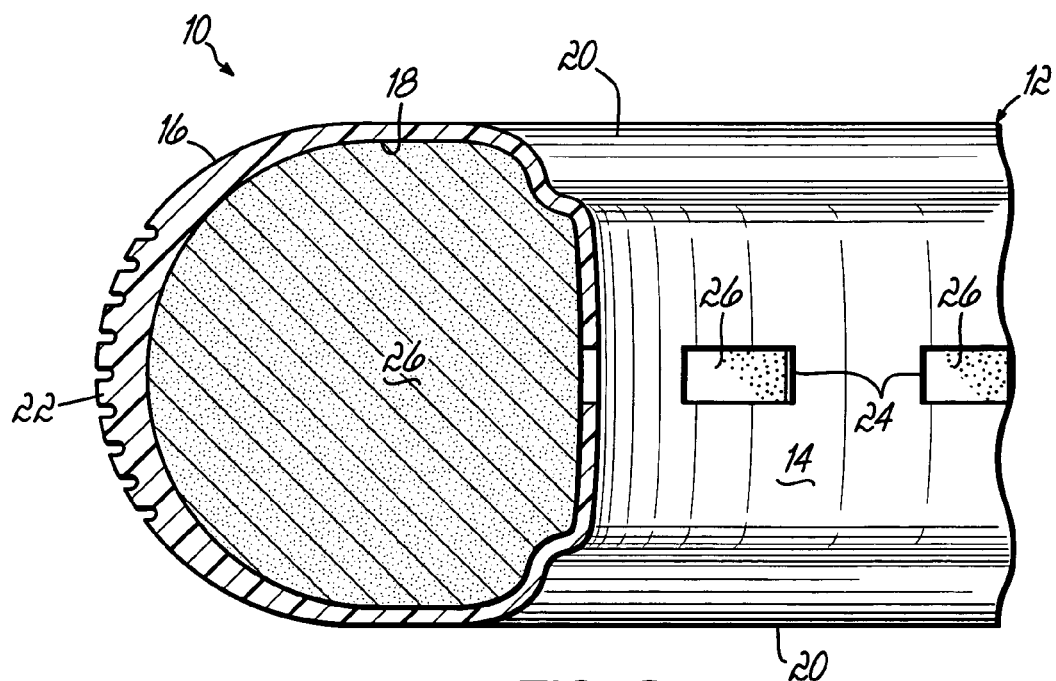
FIG. 2 is a cross-sectional view of the embodiment illustrated in FIG. 1.

With reference to FIG. 2 there is shown, in cross-sectional view, the non-pneumatic tire illustrated in FIG. 1. As shown, the hollow interior chamber 18 in tube 12 is completely filled with a solid fill composition 26. Fill composition 26 may be selected depending upon properties and tire characteristics desired. In one embodiment, fill composition is a foam-like material, such as polyurethane. Polyurethanes are generally formed from a reaction between a mixture or combination of a diisocyanate and a polyol. Any number of polymeric diisocyanates alone or blended with other diisocynates may be utilized as appreciated. Suitable examples include polymeric diphenylmethane diisocyanate (MDI) such as those commercially available including PAPI 2027, PAPI 2901, PAPI 2094 supplied by Dow; RUBINATE M, RUBINATE 1820, and RUBINATE 9041 supplied by ICI; MONDUR MR, MONDUR MR-5, MONDUR MRS, MONDUR MRS-5, MONDUR MRS-4 supplied by Bayer; and LUPRANATE-20 and LUPRANATE-10 supplied by BASF.

The polyol component may include any one or a combination of conventional polyols. Examples of suitable polyols include ethylene glycol, diethylene glycol, and dipropylene glycol, phenyl dienthanolamine, and REZOL EPO 225 sold by Witco, MP, diol, neopentyl glycol, trimethylol propane, glycerine, VORANOL 230-660 sold by Dow Chemical, PLURACOL TP440 sold by BASF and POLY-G 20-265 sold by Olin Chemical. Polyols may also be synthetically produced or modified as desired. Particularly, the molecular weight of the polyol and the number of terminal hydroxyl groups available to react with the diisocyanate may vary as desired. The hydroxyl number of the polyol is defined as the amount of KOH, in milligrams equivalent to the free hydroxyl groups present in 1 gram of the polymer. Polyethers suitable for use in fill composition 26 may be obtained by the action of a triol or higher polyol such as a glycerine, trimethylol, trimethylol propane, and pentaerythritol.

Fill composition 26 may further include other desirable components to convey the desired properties and/or durability as well as hardness to the final non-pneumatic tire. For example, ingredients such as foaming agents including, without limitation, water; hydrocarbons such as cyclopentane, pentane, hexane, heptane, pentene, heptene; azo compounds such as azohexahydrobenzodinitrile, azodicarbonamide; CFC halogenated hydrocarbons such as dichlorodifluoromethane, trichlorofluoromethane, dichlorodifluoroethane, HCFC hydrocarbons, HFC hydrocarbons and methoylene chloride, as well as plasticizing extender oils and oil blends may be used. Plasticizing extender oils or any other process oils commonly used to extend polymers should be compatible with the cured polyurethane elastomers. If the extender oil is removed from the formulation, the hardness of the elastomer may increase, sometimes as high as by a factor of four. Suitable extender oils are substantially aromatic, contain polar compounds and are designated as aromatic extract oils. Less polar extender oils, those that contain lesser amounts of an aromatic and polar compounds, or even non-polar extender oils, can be blended with the polar extender oils so that the resulting blend has at least a slight polarity and is compatible with the cured polyurethane elastomer. Suitable examples include naphthenic and paraffinic process oils with high levels of aromatic and polar compounds such as those sold by Witco Corporation, Sun Company, Shell Oil Company, BP Oil Company, and Crowley Chemical Company.

The advantageous properties of the tires of the present invention including ride quality, light weight, load carrying capacity and resistance to elements of the environment, such as UV from sunlight and ozone from the atmosphere, render the present tires more useful than previously utilized non-pneumatic tires. Particularly, the fill composition 26 conveys various advantages. The inner fill composition 26 being a foam or similar polyurethane-based material provides a light weight, yet durable and structurally strong, composition suitable for preventing deflation and failure of the tire. Polyurethanes are known to be a light weight material. In addition, polyurethanes are generally hard and durable, sufficient to provide good load carrying capability. In one embodiment, fill composition 26 has a surface Durometer hardness of at least about 60 (as measured by Shore A). In another embodiment, fill composition 26 has a surface Durometer hardness in the range from about 68 to about 75 (Shore A). Similarly, fill compositions 26, in accordance with the invention, have Asker hardness of about greater than 60. Such a high level of hardness provides the advantage of increasing the load or weight carrying capability of the tire without a corresponding increase in overall tire weight, as seen with previously proposed non-pneumatic tires or filled pneumatic tires. It should be understood, as with all solid polyurethane materials, the surface Durameter is important for it contributes to the overall hardness of the solid, while the interior hardness (core of polyurethane solid) generally has a hardness less than that of the surface.

Figure 3C:
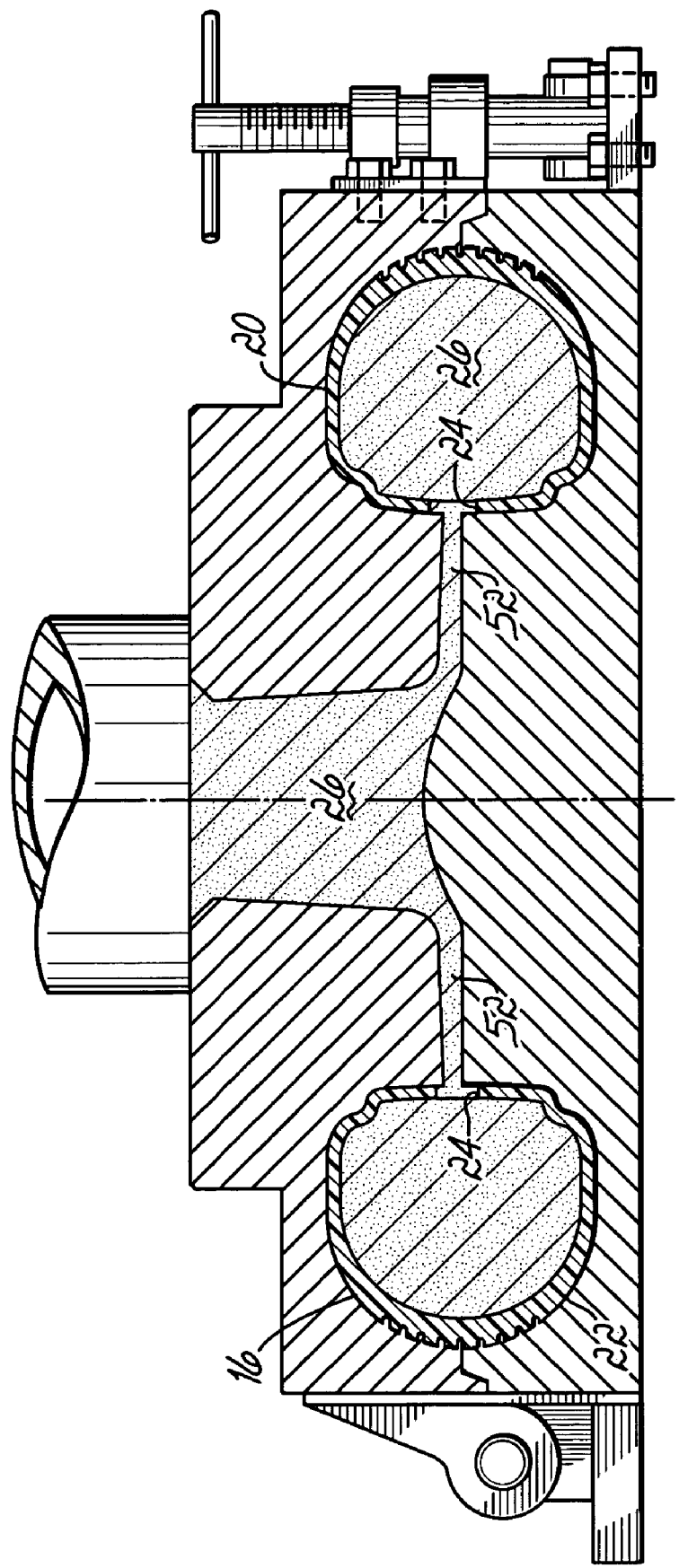

Various methods may be used to make the non-pneumatic tires of the present invention. For example, methods involving the use of one or more molds such as the rotating mold illustrated in FIGS. 3A-3C, may be used to make the non-pneumatic tires. In one embodiment, the method generally includes extruding an elastomeric material such as rubber to form the outer tire casing. The extruded material is then shaped and spliced into a circle and cured in a mold (not shown) to form a completely enclosed, toroidal-shaped tube 12 or tire skin having a hollow, interior chamber or cavity 18. The mold may also provide a tread pattern 22 on the outer circumferential surface 16 of tube 12. After removing the cured tube from the mold, a desired number of elongated openings 24 or slots are cut at spaced locations proximate the inner circumferential surface 14. Each opening 24 exposes the interior chamber 18. With reference to FIG. 3A, slit tube 12 is then placed in a second mold 50 and filled with the fill composition 26 in a open "spin casting method". In one embodiment, mold 50 has upper and lower mold plates pivotally coupled to each other and collectively define a recess therein for supporting tube 12. Moreover, the upper mold plate cooperates with the bottom mold plate to form channels 52 that extend radially toward the recess. In this method, a premixed liquid fill composition 26, such as the polyurethane based foam, is injected into the interior cavity of the casing via channels 52 through one or more of the cut openings 24 during rotation, as shown in FIG. 3B. Alternatively, the machine or instrument utilized in the spin casting method may have individual fill components A (desired diisocyanate) and (desired polyol) in separate areas and mix them in desired amounts and ratios just prior to injection into the tire casing. The mold is rotated at a desired speed during injection or filling of the tube. In one embodiment, the mold is rotated at a speed of about 500 rpm while the interior cavity of the tire is filled by injecting with a liquid polyurethane fill composition. Centrifugal force, due to the rotation of the tire, disperses composition 26 evenly throughout the interior cavity of the tire casing, as illustrated in FIG. 3B, and ensures that the filling occurs radially inward until the entire cavity 18 is full (FIG. 3C). The rate and time required to completely fill tube 12 will generally depend on the rate of rotation or the rotational force generated by the rotation speed of the tire.

Composition 26 is allowed to cure in ambient conditions, such as at room temperature, and the fill begins to set or harden shortly thereafter. Curing times for the fill composition will vary in accordance with the components and the constituency of the components of the fill therein. For example, while the polyurethane formation from a reaction between the diisocyanate and the poylol component is quick, depending on concentration of these components and concentrations of other desirable recipients in the fill composition, curing may occur at room temperature or with the addition of heat and/or pressure to fully set or harden. Polyurethane compositions generally cure in as little as about ten minutes. The tire is then removed from the mold and allowed to set for additional time, such as from about 2 hours to about 24 hours, to allow the composition to fully cure and harden.

The fully cured and ready tire may then be mounted onto a rim suitable to the inner circumference of the tire by conventional mounting methods. For example, the tire may be mounted utilizing a machine with fingers that stretch the tire over the rim flange and then retracts. Another conventional mounting technique involves the use of a plastic cone that is driven hydraulicly through the tire, thereby expanding the tire to allow insertion of the tire onto the rim. Once mounted, the tire assembly can be installed and used in the normal fashion as would a normal pneumatic, semi-pneumatic or other non-pneumatic tire. Accordingly, the wheels so formed by the rim and tire, may be utilized on a variety of vehicles including, without limitation, a golf cart, a wheel barrow, a hand cart, a construction cart, a lawnmower, a motorized/non-motorized wheel chair, a material cart, a farm machine, and on other low speed vehicles.

The foregoing advantages or benefits of the present invention will be further appreciated and made more apparent in light of the following examples.

EXAMPLE 1

An exemplary embodiment of the non-pneumatic tire provided by the present invention and for use on a wheel barrow is made by the following process. First, a rubber tube was extruded utilizing conventional extruding techniques and conventional rubber compositions, and then cut to desired length and then shaped and spliced into a circle. Once in the circle the rubber was then cured via external platens and heated to about 320° F. in a compression mold with about 90 psi internal air pressure. The tube so formed had the following dimensions: outside diameter was about 14.7 inches; tire section width was about 3.7 inches; tire section height was about 3.6 inches; tread crown radius was about 2.0 inches; tread crown arc was about 4.1 inches; inside diameter was about 8 inches, and tire base width was about 2.3 inches. The rubber tube was then removed from the mold and 8 rectangular slots, each having a width of about 0.5 inches, and a length of about 0.75 inches, were cut out longitudinally in a circumferential direction along the inner circumference of the rubber tire. The slotted rubber tube was then loaded into a second mold which was rotated at approximately 500 rpm by an electric motor. A premixed polyurethane foam was then injected at a predetermined, desirable speed and rate through the cut slots into the inner cavity of the rubber tube. The fill composition included a liquid polyol component A, containing a foaming agent, and a liquid polyisocyanate component B that come together in a mix head which ultimately injected the liquid mixture through the slots along the inner circumferential surface of the tube while the tube and the mold were spinning. Once the inner cavity of the tube was full, the liquid fill composition was then allowed to cure. The polyurethane partially cured and set at room temperature after only about ten minutes. The tire was then removed from the mold and allowed to sit at room temperature for about 24 hours allowing the polyurethane to fully cure. The rubber skin of the tube was found to have a Durometer hardness of about 62, and the polyurethane fill composition a surface Durometer hardness of about 69 with a core Durometer hardness of about 48, as measured by Shore A. The tire weighed about 7 pounds, and had a load capacity of about 375 pounds.

EXAMPLE 2

A non-pneumatic tire was made for use on a wheel barrow, by the same method described above and had the following dimensions: outside diameter was about 13.9 inches; tire section width was about 3.7 inches; tire section height was about 3.1 inches; tread crown radius was about 3.0 inches; tread crown arc was about 3.5 inches; inside diameter was about 8 inches, and tire base width was about 2.3 inches. The 8 rectangular slots each had a width of about 0.5 inches, and a length of about 0.75 inches measured longitudinally in the circumferential direction. The rubber skin of the tube had a Durometer hardness of about 62, and the polyurethane fill composition a surface Durometer hardness of about 69 with a core Durometer hardness of about 48, as measured by Shore A, the same as in example 1. The tire weighed about 6.2 pounds, and had a load capacity of about 375 pounds.

EXAMPLE 3

A non-pneumatic tire was made for use on a material handling cart, by the same method described above and had the following dimensions: outside diameter was about 9.9 inches; tire section width was about 3.0 inches; tire section height was about 3.1 inches; tread crown radius was about 6.7 inches; tread crown arc was about 2.8 inches; inside diameter was about 4 inches, and tire base width was about 2.3 inches. The tire had 6 rectangular slots each having a width of about 0.375 inches and a length of about 0.75 inches measured longitudinally in the circumferential direction. The rubber skin of the tube had a Durometer hardness of about 62, and the polyurethane fill composition a surface Durometer hardness of about 69 with a core Durometer hardness of about 48, as measured by Shore A, the same as in example 1. The tire weighed about 3.8 pounds, and had a load capacity of about 280 pounds.

By virtue of the foregoing, there are provided non-pneumatic tires and methods for making the same, which can be used as a flat free equivalent to pneumatic tires. More specifically, the tires provided herein are used for low speed applications including without limitation, commercial lawn mowers, motorized/non-motorized wheel chairs, construction wheelbarrows, construction carts, material handling equipment, farm implement tires and replacements for semi-pneumatic and pneumatic tires used on planters, grain drills, and row crop cultivators. Additional applications and uses for the tires provided herein, contemplated herewith include use on golf carts, mobility carts, floor cleaning carts, and other markets that utilize grey non-marking pneumatic tires. The non-pneumatic tires provide many advantages and benefits over comparable tires previously proposed. For example, the elastomeric casing and polyurethane based foam type fill combines the best features of a pneumatic tire by providing a smooth ride, durability, and excellent traction characteristics while maintaining Ozone, UV, cut and tear resistence and eliminating hazards associated therewith. Further, the polyurethane tire is lightweight, thereby providing a pneumatic quality ride, while maintaining a good load carrying capability. In addition, mounting of the non-pneumatic tire or the present invention provides an adequate interference fit for mounting on a rim thereby eliminating the need to include carcass fabric and/or steel wire beads as necessary for conventional pneumatic tires.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is, therefore, not limited to the specific details, representative apparatus, method, and examples described. Accordingly, departures may be made from such details without departing from the scope or spirit of Applicants' general inventive concept.

What is claimed is:

1. A non-pneumatic tire comprising:
   a toroidal-shaped tube having inner and outer circumferential surfaces interconnected by opposite side surfaces to collectively form a hollow chamber therebetween, said tube comprising four or more openings independently located proximate the inner circumferential surface; and
   a circumferentially continuous solid fill disposed in the hollow chamber of the tube,
   wherein each of the openings is adapted to receive fill composition such that the fill composition extends along the entire circumference of the hollow chamber of the tube and forms the circumferentially continuous solid fill.

2. The tire of claim 1 wherein the fill composition comprises a foam material.

3. The tire of claim 1 wherein the fill composition comprises a polyurethane.

4. The tire of claim 1 wherein the fill composition has a surface Durometer hardness of greater than about 60 as measured by Shore A.

5. The tire of claim 1 wherein the fill composition has a surface Durometer hardness in the range from about 68 to about 75 as measured by Shore A.

6. The tire of claim 1 wherein the tube is formed of an elastomeric material.

7. The tire of claim 6 wherein the tube is formed of rubber.

8. The tire of claim 7 wherein the rubber is free of reinforcing agents.

9. The tire of claim 1 wherein the tube has a number of openings ranging from 4 to 12 at spaced locations along the inner circumferential surface.

10. The tire of claim 1 wherein the tube has 8 openings spaced along the inner circumferential surface.

11. The tire of claim 1 wherein the tube comprises a plurality of layers with the outermost layer defining the inner and outer circumferential surfaces and opposite side surfaces of the tube and the innermost layer defining the hollow chamber.

12. The tire of claim 1 wherein the tube further comprises a raised area on the outer circumferential surface of the tube forming a tread pattern along the outer circumferential surface.

13. A wheel comprising a rim and the tire of claim 1 mounted on the rim.

14. A low speed vehicle comprising the wheel of claim 13.

15. A non-pneumatic tire comprising:
    a toroidal-shaped tube having inner and outer circumferential surfaces interconnected by opposite side surfaces to collectively form a hollow chamber therebetween, said tube comprising a number of independent openings ranging from 4 to 12 with each opening spaced at locations proximate the inner circumferential surface; and
    a circumferentially continuous solid fill disposed in the hollow chamber of the tube, the solid fill having a surface Durometer hardness of greater than about 60, as measured by Shore A;
    wherein each of the openings is adapted to receive fill composition such that the fill composition extends along the entire circumference of the hollow chamber of the tube and forms the circumferentially continuous solid fill.

16. The tire of claim 15 wherein the fill composition has a surface Durometer hardness in the range from about 68 to about 75, as measured by Shore A.

17. The tire of claim 15 wherein the fill composition comprises a polyurethane-based foam.

18. The tire of claim 15 wherein the tube has 8 rectangular openings, each opening having a width ranging from about 0.2 inches to about 0.8 inches and a length ranging from about 0.5 inches to about 1 inch, the openings being substantially equidistantly spaced along the interior circumferential surface.

19. The tire of claim 15 wherein the tube further comprises a raised area on the outer circumferential surface of the tube forming a tread pattern along said outer circumferential surface.

20. The tire of claim 15 wherein the tube has an outer diameter ranging from about 8 inches to about 20 inches, an inner diameter ranging from about 2 inches to about 16 inches, an outer circumferential surface having a width ranging from about 2 inches to about 6 inches, and a tire height measured radially between the outer and inner circumferential surfaces ranging from about 2 inches to about 6 inches.

21. The tire of claim 15 wherein the tube has a Durometer hardness of greater than about 50, as measured by Shore A.

22. A wheel comprising a rim and the tire of claim 15 mounted on said rim.

23. A low speed vehicle comprising the wheel of claim 22.

24. The vehicle of claim 23 selected from the group consisting of a golf cart, a wheel barrow, a hand cart, a construction cart, a lawnmower, a wheel chair, a material cart, and a farm machine.

25. A non-pneumatic tire comprising:
a toroidal-shaped rubber tube having inner and outer circumferential surfaces interconnected by opposite side surfaces to collectively form a hollow chamber therebetween, said tube comprising a number of independent rectangular openings ranging from 4 to 12, each opening having a width ranging from about 0.3 inches to about 0.5 inches and a length ranging from about 0.6 inches to about 0.8 inches, the openings being substantially equidistantly spaced along the interior circumferential surface; an outer diameter ranging from about 8 inches to about 20 inches, an inner diameter ranging from about 2 inches to about 16 inches; an outer circumferential surface having a width ranging from about 2 inches to about 6 inches; and a height measured radially between the outer and inner circumferential surfaces ranging from about 2 inches to about 6 inches; and a circumferentially continuous solid polyurethane foam fill disposed in the hollow chamber of the tube, said solid polyurethane foam fill having a surface Durometer hardness in the range from about 68 to about 75, as measured by Shore A, wherein each of the openings is adapted to receive fill composition such that the fill composition extends along the entire circumference of the hollow chamber of the tube and forms the circumferentially continuous solid polyurethane foam fill.

26. The tire of claim 25 wherein the tube has a Durometer hardness of greater than about 50, as measured by Shore A.

27. A wheel comprising a rim and the tire of claim 25 mounted on said rim.

28. A low speed vehicle selected from the group consisting of a golf cart, a wheel barrow, a hand cart, a construction cart, a lawnmower, a wheel chair, a material cart, and a farm machine, the vehicle comprising the wheel of claim 27.

* * * * *